United States Patent
Zhang et al.

(10) Patent No.: US 9,075,663 B2
(45) Date of Patent: Jul. 7, 2015

(54) CLOUD-BASED WEB WORKERS AND STORAGES

(75) Inventors: Xinwen Zhang, San Jose, CA (US);
Simon J. Gibbs, San Jose, CA (US);
Anugeetha Kunjithapatham,
Sunnyvale, CA (US); Sangoh Jeong,
Palo Alto, CA (US)

(73) Assignee: Samsung Electronics Co., Ltd.,
Suwon-si (KR)

( * ) Notice: Subject to any disclaimer, the term of this patent is extended or adjusted under 35 U.S.C. 154(b) by 999 days.

(21) Appl. No.: 12/778,846

(22) Filed: May 12, 2010

(65) Prior Publication Data

US 2011/0282940 A1 Nov. 17, 2011

(51) Int. Cl.
*G06F 15/16* (2006.01)
*G06F 9/50* (2006.01)
*G06F 9/48* (2006.01)

(52) U.S. Cl.
CPC ............ *G06F 9/5072* (2013.01); *G06F 9/4843* (2013.01)

(58) Field of Classification Search
USPC ........................................................ 709/204
See application file for complete search history.

(56) References Cited

U.S. PATENT DOCUMENTS

| | | | | |
|---|---|---|---|---|
| 8,296,763 | B1* | 10/2012 | Peercy et al. | 718/1 |
| 2003/0105810 | A1* | 6/2003 | McCrory et al. | 709/203 |
| 2006/0224741 | A1* | 10/2006 | Jackson | 709/226 |
| 2006/0230149 | A1* | 10/2006 | Jackson | 709/226 |
| 2007/0143323 | A1* | 6/2007 | Vanrenen et al. | 707/101 |
| 2009/0248693 | A1* | 10/2009 | Sagar et al. | 707/10 |
| 2010/0042720 | A1* | 2/2010 | Stienhans et al. | 709/226 |
| 2010/0131590 | A1* | 5/2010 | Coleman et al. | 709/203 |
| 2010/0274910 | A1* | 10/2010 | Ghanaie-Sichanie et al. | 709/229 |
| 2010/0318630 | A1* | 12/2010 | Howell et al. | 709/218 |
| 2010/0332818 | A1* | 12/2010 | Prahlad et al. | 713/150 |
| 2011/0004916 | A1* | 1/2011 | Schiffman et al. | 726/1 |
| 2011/0016214 | A1* | 1/2011 | Jackson | 709/226 |
| 2011/0161928 | A1* | 6/2011 | Sangra et al. | 717/115 |
| 2011/0258692 | A1* | 10/2011 | Morrison et al. | 726/11 |
| 2012/0047239 | A1* | 2/2012 | Donahue et al. | 709/220 |
| 2012/0179808 | A1* | 7/2012 | Bergkvist et al. | 709/223 |
| 2012/0192197 | A1* | 7/2012 | Doyle et al. | 718/103 |

OTHER PUBLICATIONS

IBM White Paper "Cloud Computing" (2007) to Boss et al. ("Boss"); http://download.boulder.ibm.com/ibmdl/pub/software/dw/wes/hipods/Cloud_computing_wp_final_8Oct.pdf.*
CCSW paper "Securing Elastic Applications on Mobile Devices for Cloud Computing" (Nov. 13, 2009) to Zhang et al. ("Zhang").*
OReilly book "Java Web services up and running" (publication date: Feb. 12, 2009) to Kalin. ("Kalin").*

(Continued)

*Primary Examiner* — June Sison
(74) *Attorney, Agent, or Firm* — Sherman IP LLP; Kenneth L. Sherman; Hemavathy Perumal

(57) ABSTRACT

In accordance with one aspect of the invention, web workers and local storages can be extended to a cloud-based environment. This allows web workers to be executed on any of a number of different cloud platforms located in a cloud, leveraging available resources to provide a quicker and more efficient processing environment for the various web workers. The present invention also provides these functionalities in a way that is transparent to not just the user, but also to the web page developer as well, eliminating the need for the web page developer to be aware of the cloud-based environment and design the web page for use therewith.

18 Claims, 10 Drawing Sheets

(56) References Cited

OTHER PUBLICATIONS

W3C specification "Web Workers" (publication date: Oct. 29, 2009) to Hickson ("Hickson").*
Balan et al., "The Case for Cyber Foraging", ACM SIGOPS European Workshop, 2002, 6 pages.
Balan et al., "Tactics-Based Remote Execution for Mobile Computing", 2003, 14 pages.
Sousa et al., "Aura: An Architectural Framework for User Mobility in Ubiquitous Computing Environments", IEEE/IFIP Working Conf. on Software Architecture, 2002, pp. 1-13.
Chun et al., "Augmented Smartphone Applications Through Clone Cloud Execution", USENIX HotOS XII, 2009, pp. 1-5.
Gu et al., "Adaptive Offloading for Pervasive Computing", IEEE Pervasive Computing, vol. 3, No. 3, 2004, pp. 1-13.
Hunt et al., "The Coign Automatic Distributed Partitioning System", OSDI, 1999, 14 pages.
Rellermeyer et al., "R-OSGi: Distributed Applications Through Software Modularization", Middleware 2007, pp. 1-20.
Kozuch et al., "Internet Suspend/Resume", IEEE WMCSA, 2002, 7 pages.
Travostino et al., "Seamless Live Migration of Virtual Machines Over the MAN/WAN", SC, 2006,.
Satyanarayanan et al., "The Case for VM-based Cloudlets in Mobile Computing", IEEE Pervasive Computing, vol. 8, No. 4, 2009, pp. 1-10.
Moshchuk et al., "Flashproxy: Transparently Enabling Rich Web Content via Remote Execution", Proc. Of MobiSys, 2008, 13 pages.

* cited by examiner

CLOUD-BASED WEB WORKERS AND STORAGES

BACKGROUND OF THE INVENTION

1. Field of the Invention

The present invention relates to computer networking. More specifically the present invention relates to cloud-based web workers and storages.

2. Description of the Related Art

Today, numerous types of computing devices are available. These computing devices widely range with respect to size, cost, amount of storage and processing power. The computing devices that are available today include expensive and powerful servers, relatively cheaper Personal Computers (PC's) and laptops, and yet less expensive microprocessors (or computer chips) provided in portable storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers.

Smartphones, along with other computer systems, often run web browsers. A web browser is a software application for retrieving, presenting, and traversing information resources on the World Wide Web. Some modern smartphones, however, extend the use of web browsers to not only resources on the World Wide Web but to all resources available to the phone, making the web browser an integral part of the operating system of the smartphone.

Hypertext Markup Language (HTML) is the standard markup language used to create web pages on the world wide web. HTML5 is being proposed by the World Wide Web Consortium (W3C) as a major revision to HTML. Although the HTML5 specification has been under development since 2004, many features of HTML are supported by the latest builds of modern browsers, such as WebKit, Firefox, and Opera.

Included in the HTML5 specification are the concepts of web workers and local storages. A web worker is a script that runs in the background within the browser, independently of any user interface scripts. This allows for long-running scripts that are not interrupted by scripts that respond to clicks or other user interactions, and allows long tasks to be executed without yielding, to keep the web page responsive.

The popularity of computing systems is evidenced by their ever increasing use in everyday life. Accordingly, techniques that can improve computing systems would be very useful.

SUMMARY OF THE INVENTION

Broadly speaking, the invention relates to computing systems and computing environments. More specifically the present invention relates to cloud-based web workers and storages.

In accordance with one aspect of the invention, web workers and local storages can be extended to a cloud-based environment. This allows web workers to be executed on any of a number of different cloud platforms located in a cloud, leveraging available resources to provide a quicker and more efficient processing environment for the various web workers. The present invention also provides these functionalities in a way that is transparent to not just the user, but also to the web page developer as well, eliminating the need for the web page developer to be aware of the cloud-based environment and design the web page for use therewith.

In accordance with another embodiment of the invention, a web worker's local storage can be shared with the main thread of a web application (as well as other web workers) to provide a common storage area for all processes of the web application.

The present invention enables web workers to work transparently in a cloud. This might include any type of cloud platform, such as a private cloud (home or enterprise) or a public cloud. In order to transparently support this, one aspect of the present invention provides the ability for web workers to communicate with a web page's main thread through existing application program interfaces (APIs), via traditional message-based communication channels. This aspect of the present invention also allows web workers to communicate with each other no matter whether they are local (on the same device) or remote (on different devices). This aspect of the present invention additionally allows web works to access local database storage with existing APIs, as well as to access external web servers. Furthermore, one aspect of the present invention causes the web worker to comply with the same security policies as it would if it were running in the main thread or the web page.

In order to provide the above-described functionality, one or more web worker proxy managers can be provided throughout the cloud platform. In one embodiment of the present invention, each cloud platform contains one web worker proxy manager. However, it should be noted that it is not mandatory for each cloud platform to contain a proxy manager. In some embodiments, for example, only cloud platforms on which a web worker has been spawned will include a web worker proxy manager. In another embodiment, web worker proxy managers are only necessary for communications to a remote web worker, and thus a web worker proxy manager is only located on cloud platforms that have spawned web workers that need to communicate with remote web workers.

The invention can be implemented in numerous ways, including, for example, a method, an apparatus, a computer readable (and/or storable) medium, and a computing system (e.g., a computing device). A computer readable medium can, for example, include and/or store at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
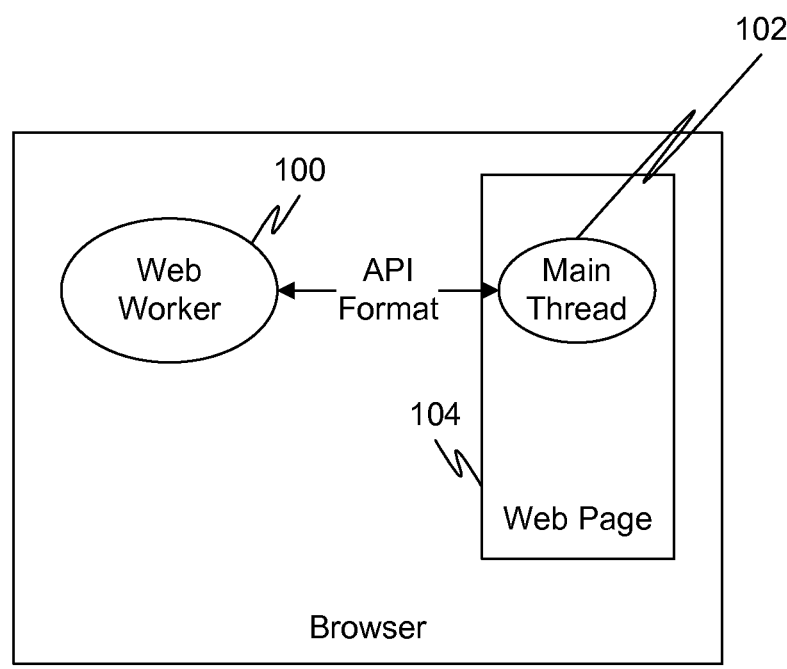
FIG. 1A shows a background worker of a main thread of a web page.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The present invention involves extending the concept of web workers and local storage to a cloud-based environment. This allows web workers to be executed on any of a number of different cloud platforms, leveraging available resources to provide a quicker and more efficient processing environment for the various web workers. The present invention also provides these functionalities in a way that is transparent to not just the user, but also to the web page developer as well, eliminating the need for the web page developer to be aware of the cloud-based environment and design the web page for use therewith.

Cloud computing involves the sharing of resources across multiple devices, usually through the Internet or other network (termed the "cloud"). Shared resources, software and information can then be provided to computers and other devices on-demand, like a public utility. The sharing devices may be other devices operated by the same user, or may be controlled more generally, such as by an Internet Service Provider (ISP) or cell phone network subscribed to by the user.

As described in the background section, a web worker is a script that runs in the background within the browser (or other web application), independently of any user interface scripts. This allows, for example, multiple Javascript scripts to be run in parallel on a web page, without blocking the user interface. Typically, a web worker is an independent browser execution context (thread or process) that can run from any web page, and can additionally run in the background and talk with the web page that creates it via dedicated message channels. A web worker can also talk with web servers directly via common communication methods (e.g., XMLHttpRequest, Websocket). A web worker can also store data persistently in local data storages.

FIGS. 1A-1D are diagrams illustrating multiple different web worker embodiments. FIG. 1A shows a background computation worker 100 of a main thread 102 of a web page 104. A background computation worker is a web worker designed to provide background computations for the main thread 102 to take some of the load off the main thread 102. It may communicate with the main thread 102 via a postmessage( ) or onmessage( ) command (via an API).

Figure 1B:
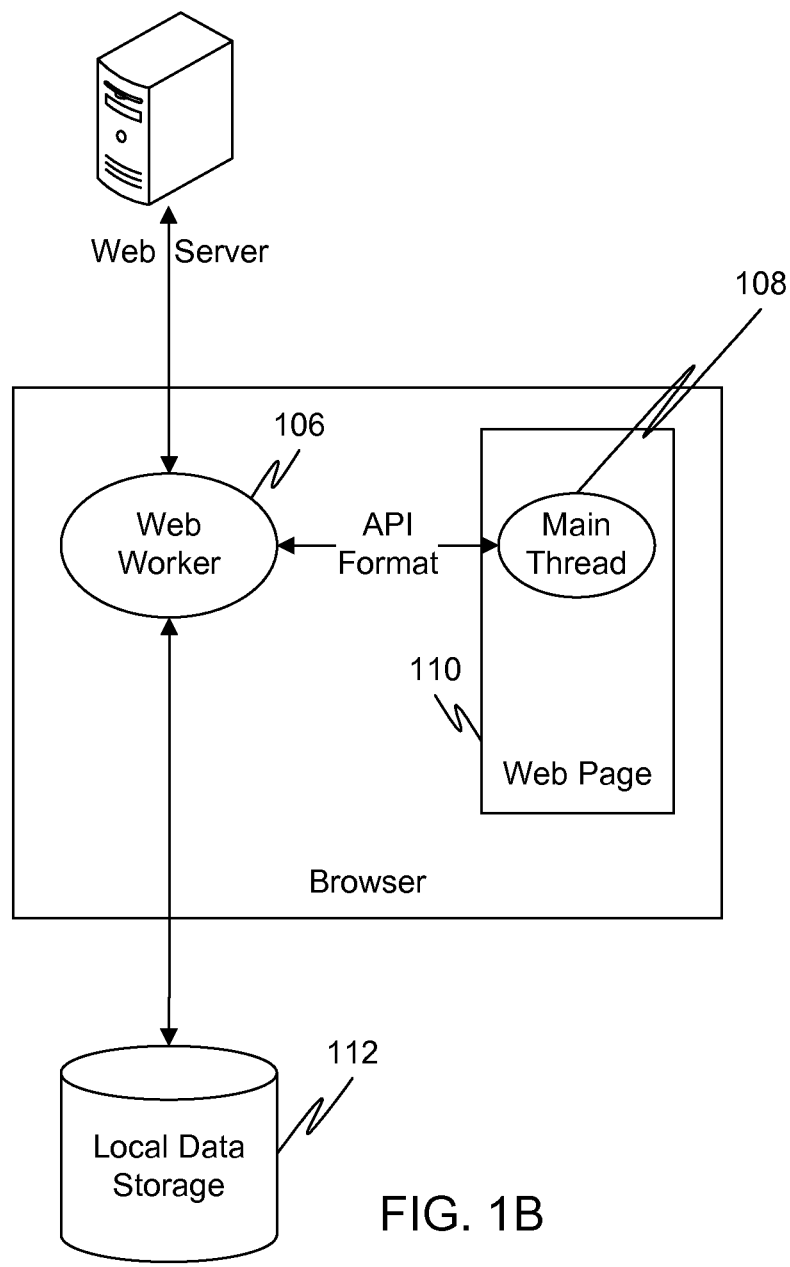
FIG. 1B shows another background worker of a main thread of a web page.

FIG. 1B shows a background worker 106 of a main thread 108 of a web page 110. The difference between background worker 106 of FIG. 1B and background computation worker 100 of FIG. 1A is that background worker 106 accesses its own local data storage 112. It should be noted that despite these examples being depicted in different figures, there is no major division between the types of web workers. In other words, any web worker could perform background computations and/or access its own local data storage.

Figure 1C:
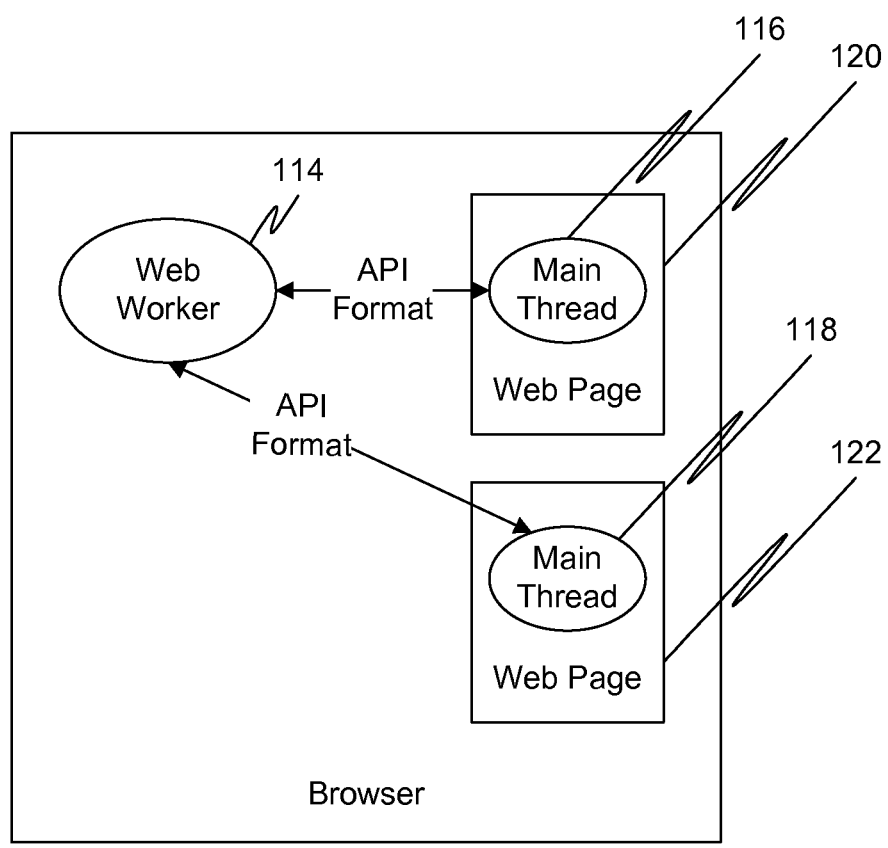
FIG. 1C shows a shared worker, which is shared between two main threads.

FIG. 1C shows a shared worker 114, which is shared between main threads 116, 118 of multiple web pages 120, 122. In this way, it is not necessary to design or spawn multiple worker processes when one can do and be shared among multiple main threads.

Figure 1D:
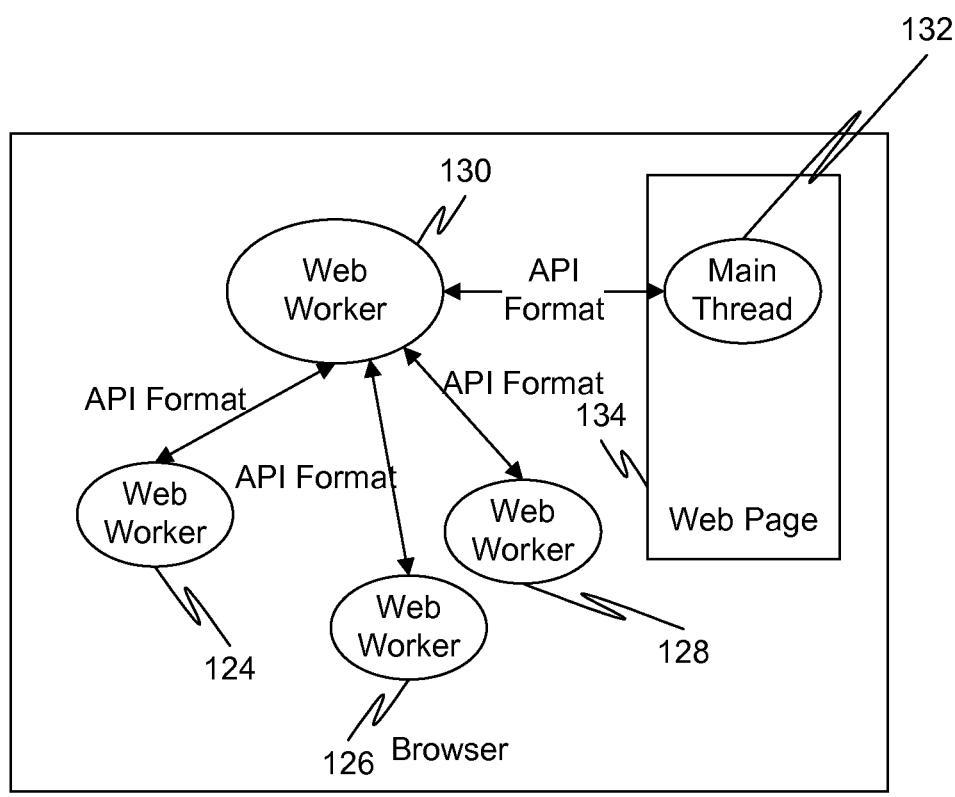
FIG. 1D shows delegated workers of a worker.

FIG. 1D shows delegated workers 124, 126, 128 of worker 130. Here, worker 130 is designed to be a background worker for main thread 132 of web page 134, but worker 130 can itself spawn its own set of workers 124, 126, and 128 (which may also be known as sub-workers) to aid in its processes.

As stated earlier, the figures above are merely examples of specific actions that can be undertaken by web workers. These examples may be mixed and matched in any permutation, to provide a rich environment for the delegation of tasks in many different ways.

It should also be noted that while the present disclosure describes the use of the invention with web workers from web browsers, nothing prohibits the invention from being applied to other web applications using web workers. As such, nothing in this disclosure shall be construed as limiting the scope of the claims to web browsers, unless so expressly stated.

While web workers run in independent browser contexts and can access local storages, they cannot access global variables or the Document Object Model (DOM) tree from the main thread of the web page. Additionally, as accessing the main thread's local storage is performed only through global variables, a web worker cannot access a main thread's local storage. Despite these limitations, however, an embodiment of the present invention allows for a workaround, wherein a web worker's local storage can be shared with the main thread of the web page (as well as among other web workers) to provide a common storage area for all processes of a web page.

In one example of the workaround solution, the local data storage accessible by the web workers can include a client application, such as a Structured Query Language (SQL) database, which can store application-specific data. One of ordinary skill in the art will recognize, however, that the shared data can be stored in many different types of databases and/or storage applications, and thus the present invention should not be limited to SQL databases. This allows the web worker to share data storage with other web workers and/or the main thread.

It should also be noted that, while currently only local data storage is available to be accessed by workers, in the future that limitation may be eased or eliminated, thus negating the need for this workaround solution, and the present invention shall be construed to cover such future embodiments as well.

The present invention enables web workers to work transparently in a cloud platform. This might include any type of cloud platform, such as a private cloud (home or enterprise) or a public cloud. In order to transparently support this, one aspect of the present invention provides the ability for web workers to communicate with a web page's main thread through existing application program interfaces (APIs), via traditional message-based communication channels. This aspect of the present invention also allows web workers to communicate with each other no matter whether they are local (on the same device) or remote (on different devices). This aspect of the present invention additionally allows web works to access local database storage with existing APIs, as well as to access external web servers. Furthermore, as will be described later, one aspect of the present invention causes the web worker to comply with the same security policies as it would if it were running in the main thread or the web page.

In order to provide the above-described functionality, one or more web worker proxy managers are provided throughout the cloud. In one embodiment of the present invention, each cloud platform contains one web worker proxy manager. However, it should be noted that it is not mandatory for each cloud platform to contain a proxy manager. In some embodiments, for example, only cloud platforms on which a web worker has been spawned will include a web worker proxy manager. In another embodiment, web worker proxy managers are only necessary for communications to a remote web worker, and thus a web worker proxy manager is only located on client platforms that have spawned web workers that need to communicate with remote web workers.

Figure 2:
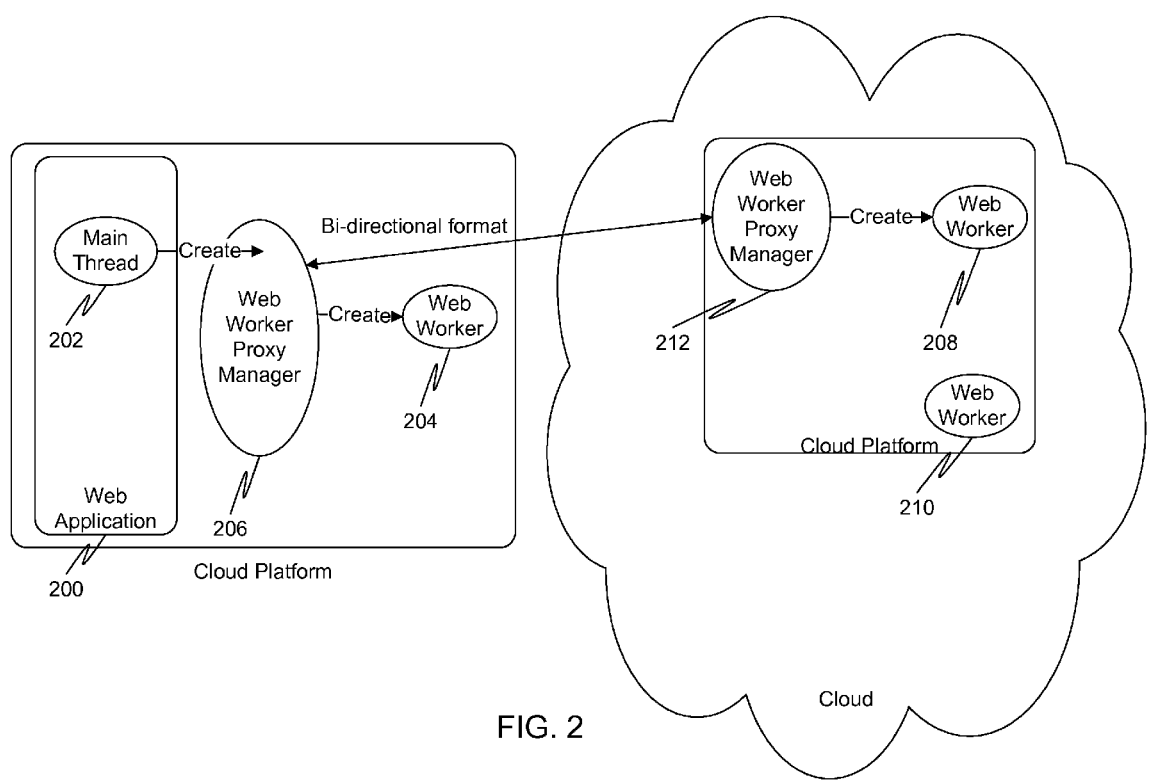
FIG. 2 is a block diagram illustrating a cloud-based web worker system in accordance with an embodiment of the present invention.

FIG. 2 is a block diagram illustrating a cloud-based web worker system in accordance with an embodiment of the present invention. Here, web application 200 contains main thread 202, which invokes web worker 204. Rather than this invocation occurring directly, however, web worker proxy manager 206 is provided that receives the request from the main thread 202 to invoke the web worker and performs the invocation. This allows the web worker to be invoked on any cloud platform in the cloud, as the web worker proxy manager 206 can elect to invoke the web worker 204 locally, as depicted in FIG. 2, or may elect to invoke web worker remotely, such as web worker 208 or web worker 210. Here, web worker 208 is invoked remotely by the web worker proxy manager 206, possibly including the involvement of a remote web worker proxy manager 212.

Thus, whenever the main thread of a web application, such as a loaded web page with HTML script, invokes a web worker, it can send the request to the web worker proxy manager 206, which decides where to launch the web worker (on the same browser environment of the device or on a cloud). In one embodiment of the present invention, the web worker proxy manager is implemented via a browser plug in or an internal component of the web application. In another embodiment of the present invention, the web worker proxy manager is a separate, specialized web worker. The web worker proxy manager 206 can provide the same web worker message APIs as were used previously, thus preserving the transparency of the system to both the users and the web page developers.

In an embodiment of the present invention, the web worker proxy manager 206 checks security policies on launching a web worker. For example, the proxy manager 206 may follow a same-origin policy (SOP) so that a web worker can only be accessed by resources sharing the same origin as would be permitted by the main thread 202. A web worker may only be invoked if it passes all these security checks. This helps to ensure that the web worker is not invoked in a such a way that would be contrary to the security policies of the main thread, which would obviously cause the processes to be less than transparent.

In another aspect of the present invention, the web worker proxy manager may maintain a table with each loaded web page. The table may include the information of all active web worker names (accessed by the main thread in the web page), as well as other information relevant to communicating with the web workers, such as uniform resource locators (URLs) if they are running in a cloud, or message ports if running locally.

The web worker proxy manager decides where to launch the targeted web worker. If it launches the web worker locally, it invokes the web worker with parameters identified by the main thread, and can then update its table with the related information regarding the launched web worker.

If the web worker proxy manager decides to launch the target web worker remotely, it can file a request with a remote web worker proxy manager. This request may include the parameters identified by the main thread, as well as the code of the web worker. The remote web worker proxy manager may then arrange necessary resources (e.g., core, storage) and launch the web worker with the transferred parameters.

The remote web worker proxy manager can send information on the web worker URL once it is launched, to the local web worker proxy manager, which can then add it to its table. After this has been configured, the main thread and the invoked web worker(s) can talk to each other with existing message-based web worker APIs.

Figure 3:
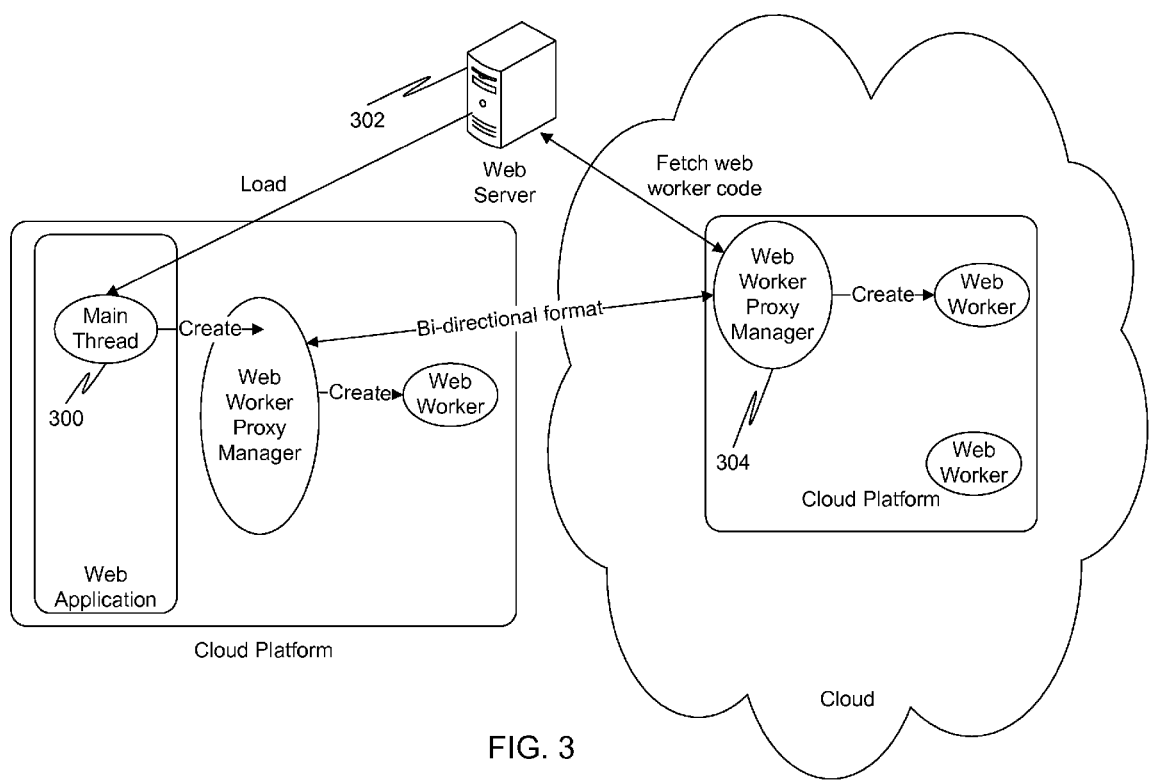
FIG. 3 is a block diagram illustrating a cloud-based web worker system in accordance with another embodiment of the present invention.

It should be noted that it is not necessary for the code of the web worker to be transferred directly from the local web worker proxy manager to the remote web worker proxy manager. Embodiments are possible where the remote web worker proxy manager obtains a copy of the web worker code via other methods. FIG. 3 is a block diagram illustrating a cloud-based web worker system in accordance with another embodiment of the present invention. Here, main thread 300 is obtained from a web server 302, and remote web worker proxy manager 304 obtains web worker code directly from the web server 302, via, for example, a fetch command upon receiving a request from the remote web worker proxy manager 304 to invoke a web worker.

The above description illustrates the concept of cloud-based computing in a broad manner. However, more specialized mechanisms are possible in certain embodiments of the present invention. In one embodiment, an elastic-based computing system is utilized to aid in the decision-making process by the web worker proxy managers. Elastic-based computing allows for external computing resources to be utilized (or not utilized) by decisions made at execution-time. As a result, a computing system may function with relatively limited computing resources (e.g., processing power, memory) but have the ability to effectively provide as much computing services as may be needed and provide the services when needed, on demand, and dynamically, during the execution time.

In such a system, a computing system (e.g., a computing device) can be operable to determine, during runtime of executable computer code, whether to execute (or continue to execute) one or more portions of the executable computer code by effectively using a dynamically scalable computing resource as an external computing resource. The computing system can determine the relative extent of allocation of execution of the executable computer code between internal computing resources and the external computing resources of the dynamically scalable computing resource in a dynamic manner at runtime (e.g., during load time, after load time before execution time, execution time) and allocate the execution accordingly.

It should be noted that the computing device can be operable to use a dynamically scalable resource as an abstract resource. By way of example, an Abstract and Dynamically Scalable Computing Resource (ADSCR) can be accessed using an abstract interface. Those skilled in the art will appreciate that the ADSCR, can for example, be a "Cloud" computing resource operable to deliver dynamically scalable computing resources via an abstract interface as Web-services over the Internet.

It will also be appreciated that the elastic computing system can be operable to determine, during the runtime of the executable computer code, whether to execute or continue to execute one or more portions of the executable computer code by effectively using the ADSCR, thereby dynamically determining during runtime, relative extent of allocation of execution of the executable computer code between the internal computing resources of the computing system and external computing resources of the ADSCR. Based on this determination of relative extent of allocation of execution, the elastic computing system can also be operable to effectively use the one or more external resources of the ADSCR for execution of one or more portions of the executable computer code. In other words, the elastic computing system can cause the execution of one or more portions of the executable computer code when it determines to execute one or more portions of the executable computer code by effectively using one or more of the external resources available to the ADSCR.

It should also be noted that determination of the relative extent of allocation of execution of the executable computer code can be performed by the elastic computing system, without requiring user input, thereby automatically determining the relative extent of allocation of execution of the executable computer code between said one or more internal computing resources and one or more external resources. However, it should be noted that the elastic computing system may be operable to make this determination based on one or more preferences that can, for example, be provided as a set of predetermined user-defined preferences (e.g., minimize power or battery usage, use internal resources first, maximize performance, minimize monetary cost). The elastic computing system may also be operable to make the determination of the relative extent of allocation of execution of the executable computer code based on input explicitly provided by a user at runtime. By way of example, the elastic computing system may be operable to request user input and/or user confirmation prior to allocation of execution to the ADSCR.

This determination can, for example, be made based on one or more capabilities such as the internal computing resources, monetary cost associated with using the external resources, expected and/or expectable latency for delivering services by the external resources, network bandwidth for communication with the ADSCR, status of one or more physical resources, battery power of the computing system, one or more environmental factors, physical location of the computing system, number and/or types of applications being executed on the computing system, and type of applications to be executed.

The elastic computing aspect may also be implemented using a cost model. In a cost model, different sensor data is obtained from devices on a cloud. This sensor data can be any information that may be helpful in determining on which cloud platform to invoke a web worker. This sensor information can then be fed into a model, which acts to return an indication of which cloud platform to use. This may also involve the use of a cost service, which cloud platforms which parameters are monitored/measured by cloud-side and cloud platform side, for example, data communication and network status can be measured on cloud-side, while execution power cost of cloud platform can be on the cloud platform-side.

Figure 4:
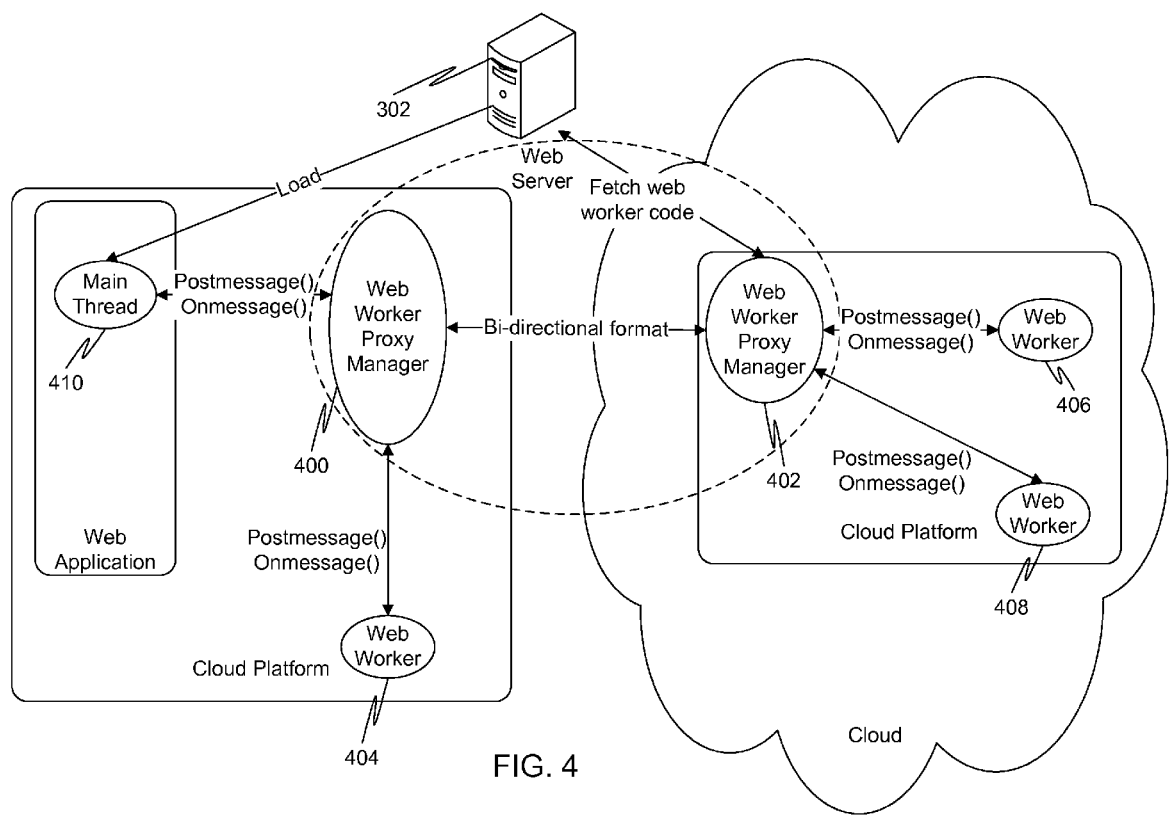
FIG. 4 is a diagram illustrating message flow at runtime of a cloud-based web worker system in accordance with an embodiment of the present invention.

FIG. 4 is a diagram illustrating message flow at runtime of a cloud-based web worker system in accordance with an embodiment of the present invention. Web worker proxy managers 400, 402 route and relay messages between web workers 404, 406, 408 and main thread 410. It should be noted that in some embodiments a web worker proxy manager is utilized for communication between web workers on the same cloud platform. However, in another embodiment, web workers located on the same cloud platform can interact directly without the need of a web worker proxy manager. However, a web worker proxy manager is still desired to be placed on such cloud platforms in order to enable communications with web workers/main threads located on other cloud platforms.

All communications among web workers and between web workers and web worker proxy managers may be performed through traditional APIs, such as HTML5 APIs, thus making the system transparent to both the users and developers. Communications between web worker proxy managers 400, 402, however, may be conducted via a bidirectional message based communication that need not be in a traditional API format. This communication may be conducted in a proprietary format if desired, without having any effect on the transparency of the system. Alternatively, a web socket API can be used for the bidirectional message based communication.

Figure 5:
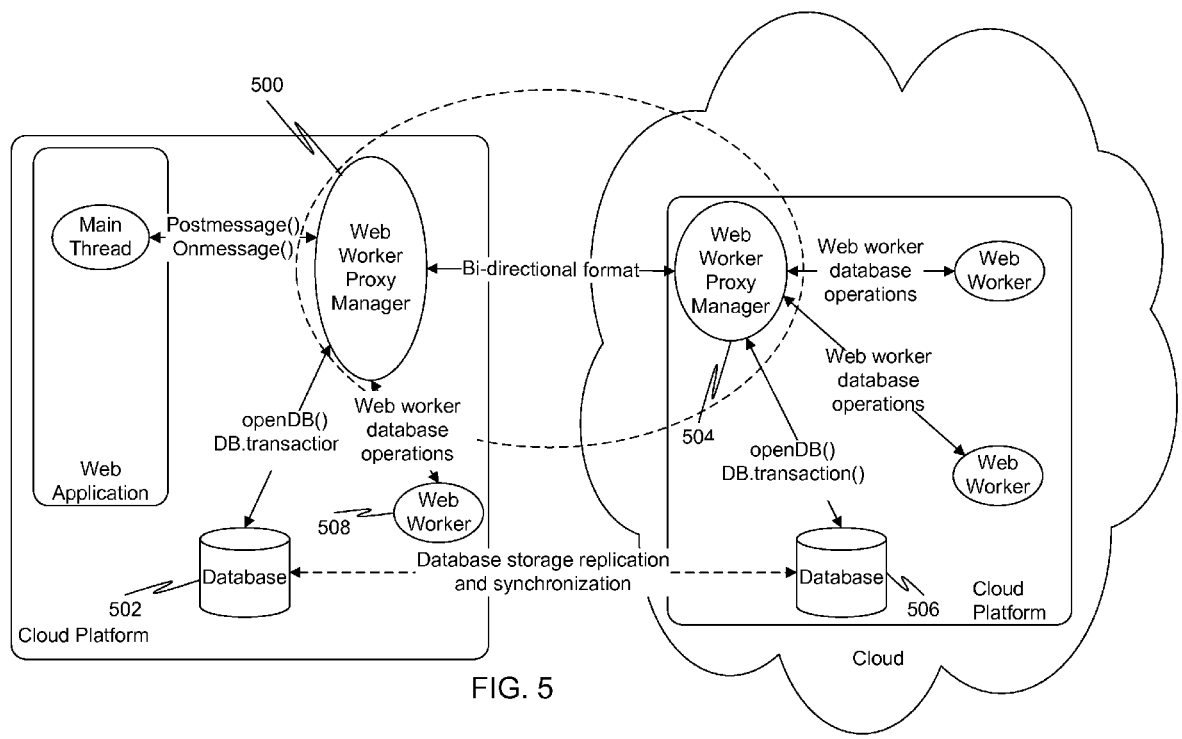
FIG. 5 is a diagram illustrating message flow at runtime of a cloud-based web worker system having local storages in accordance with another embodiment of the present invention.

Local storage may be handled in a similar manner. FIG. 5 is a diagram illustrating message flow at runtime of a cloud-based web worker system having local storages in accordance with another embodiment of the present invention. Here web worker proxy manager 500 is able to access local database 502, while web worker proxy manager 504 is able to access local database 506. When a web worker 508 invokes APIs to access the database, such as an openDB( ) command, the web worker proxy manager 500 can check both the local and cloud side to determine whether the target database exists. If not, the database is created locally (locally to the invoking web worker) and database transactions are performed as usual, such as with DB.transaction( ) commands. If the database has already been created, the web worker proxy manager 500 routes the message to the corresponding database, either on the local or cloud side. Thus, although a database 506 may be located on the cloud, it would work just like a local storage to cloud platform web workers, such as web worker 508.

In another embodiment of the present invention, databases on different cloud platforms can be replicated and/or synchronized in order to maintain the same database on different cloud platforms. This would allow, for example, all database commands to be executed locally, saving network bandwidth.

Figure 6:
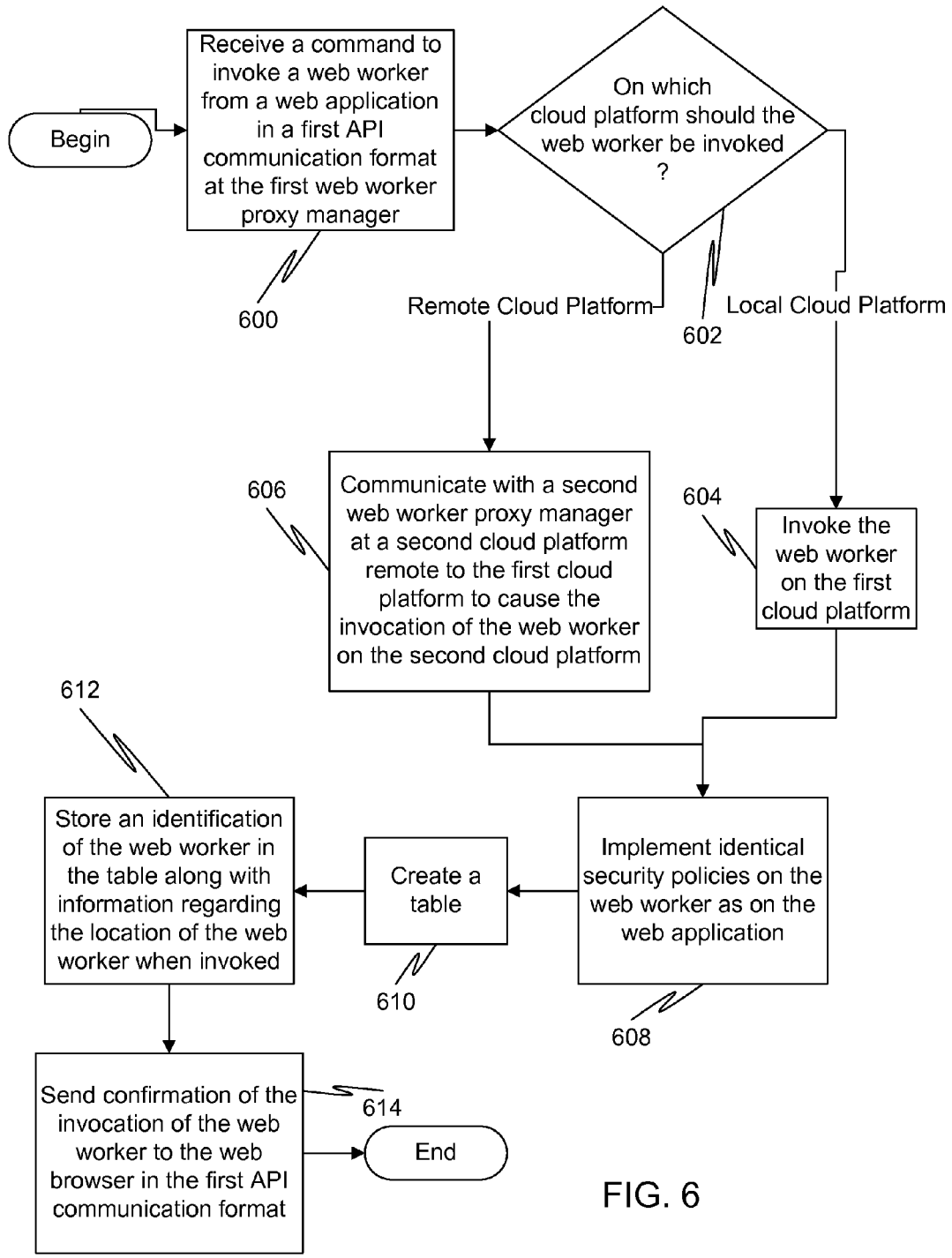
FIG. 6 is a flow diagram illustrating a method for operating a first cloud platform in accordance with an embodiment of the present invention.

FIG. 6 is a flow diagram illustrating a method for operating a first cloud platform in accordance with an embodiment of the present invention. This method is performed at the time a web application requests that a web worker be invoked. This method may be performed by a first web worker proxy manager. At 600, a command from a web application in a first API communication format is received at the first web worker proxy manager. The command is to invoke a web worker. At 602, it is determined on which cloud platform to invoke the web worker. This determination may be performed in a number of different ways. In one embodiment, it includes utilizing information regarding capabilities of the first cloud platform and the second cloud platform to determine the most appropriate cloud platform on which to invoke the web worker. It may also include using a cost model to evaluate current sensor data from the first and second cloud platforms. At 604, the web worker is invoked on the first cloud platform (i.e., locally) if it is determined to invoke the web worker on the first cloud platform. At 606, the first web worker proxy manager communicates with a second web worker proxy manager at a second cloud platform remote to the first cloud platform to cause the invocation of the web worker on the second cloud platform if it is determined to invoke the web worker on the second cloud platform. This communication may be performed via a communication format other than the first API communication format. This may include sending code for the web worker to the second web worker proxy manager during the communicating. Alternatively, the second web worker proxy manager can obtain the code on its own.

At 608, identical security policies (e.g., same origin policy) may be implemented on the web worker as on the web application. At 610, a table may be created and at 612 an identification of the web worker can be stored in the table along with information regarding the location of the web worker when invoked. It should be noted that step 610 need not be performed if a table has previously been created. The information regarding the location of the web worker when invoked can include a message port if the web worker is located on the first cloud platform (i.e., locally) and a URL if the web worker is located on the second cloud platform (i.e., remotely). At 614, confirmation of the invocation of the web worker may be sent to the web application in the first API communication format.

Figure 7:
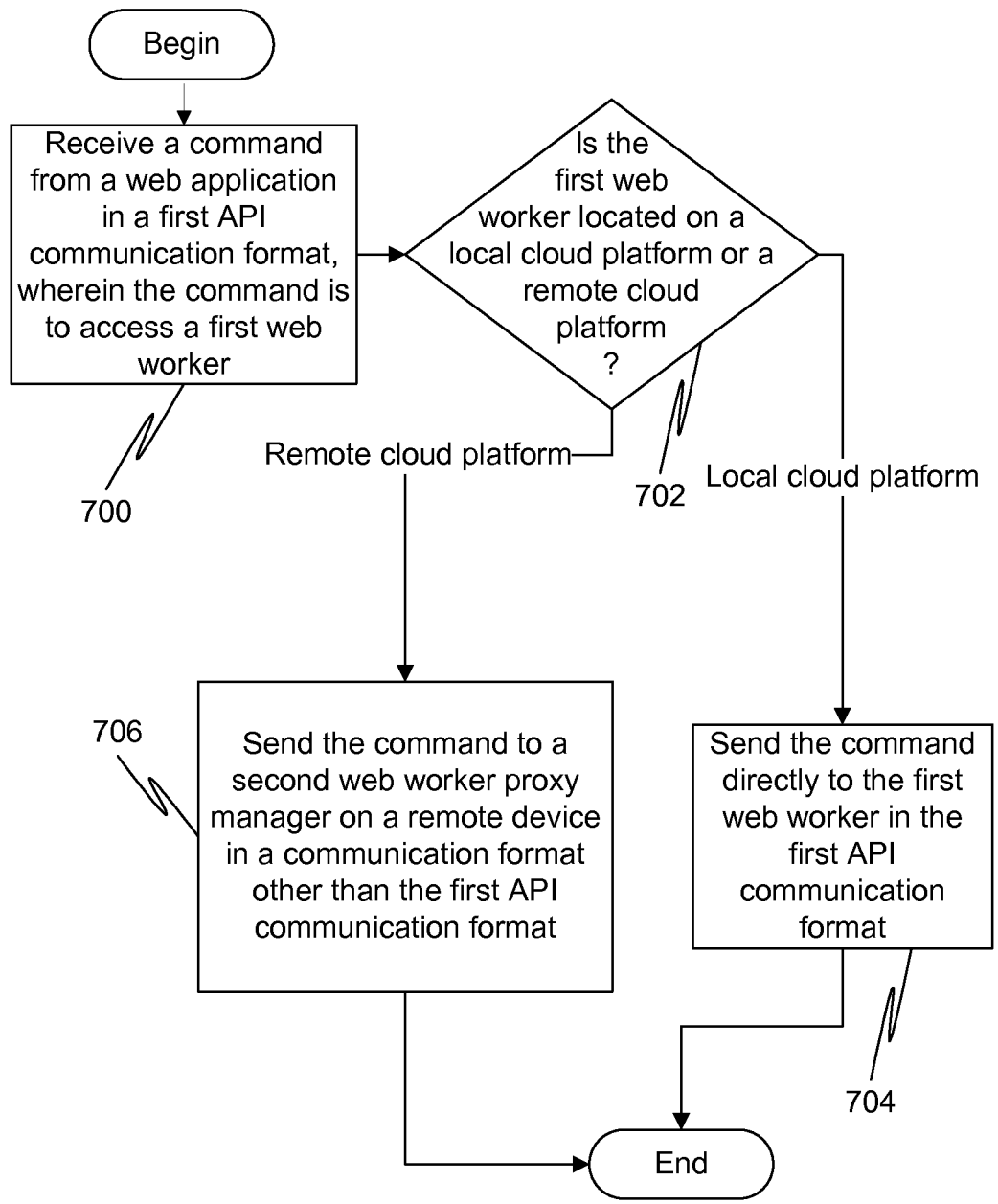
FIG. 7 is a flow diagram illustrating a method for operating a first cloud platform in accordance with another embodiment of the present invention.

FIG. 7 is a flow diagram illustrating a method for operating a first cloud platform in accordance with another embodiment of the present invention. This method is performed at the time a web application sends a command to an existing web worker. This method may be performed by a first web worker proxy manager. At 700, a command from a web application in a first API communication format is received at the first web worker proxy manager, wherein the command is to access a first web worker. At 702, it is determined if the first web worker is located on the first cloud platform or a remote cloud platform. At 704, the command is sent directly to the first web worker in the first API communication format if the web worker is located on the first cloud platform (i.e., locally). At 706, the command is sent to a second web worker proxy manager on a remote cloud platform in a communication format other than the first API communication format if the first web worker is located on the remote cloud platform.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, comprising:
receiving, at a first web worker proxy manager at a first cloud platform, a first command from a web application to invoke a web worker;
determining a cloud platform of multiple cloud platforms to invoke the web worker on, wherein the multiple cloud platforms include the first cloud platform and a second cloud platform remote to the first cloud platform;
invoking the web worker on the cloud platform determined upon determining that the web worker complies with one or more security policies of the web application;
sending confirmation of invocation of the web worker to the web application upon invoking the web worker on the cloud platform determined;
maintaining a table; and
storing an identification of the web worker in the table along with information regarding location of the web worker upon invoking the web worker on the cloud platform determined;
wherein the first web worker proxy manager is configured to communicate with a second web worker proxy manager at the second cloud platform to cause invocation of the web worker on the second cloud platform when the cloud platform determined is the second cloud platform, and wherein the second web worker proxy manager is configured to determine and allocate at least one computing resource of the second cloud platform for the web worker based on communication from the first web worker proxy manager; and
wherein the first web worker proxy manager is further configured to receive a second command from the web application or another web worker.

2. The method of claim 1, wherein:
the first web worker proxy manager is further configured to communicate to the second web worker proxy manager a request to invoke the web worker on the second cloud platform, wherein the second web worker proxy manager determines and allocates at least one computing resource of the second cloud platform for the web worker based on one or more parameters included in the request.

3. The method of claim 1, wherein:
the web worker comprises a script that runs within a browser environment when the web worker is invoked;
the information regarding the location of the web worker includes a message port if the cloud platform determined is the first cloud platform; and
the information regarding the location of web worker includes a uniform resource locator (URL) if the cloud platform determined is the second cloud platform.

4. The method of claim 1, further comprising implementing the one or more security policies on the web worker.

5. The method of claim 4, wherein the one or more security policies include a same origin policy (SOP).

6. The method of claim 1, wherein determining a cloud platform of multiple cloud platforms to invoke the web worker on comprises utilizing information regarding capabilities of the first cloud platform and the second cloud platform to determine which cloud platform of the multiple cloud platforms is most appropriate to invoke the web worker on.

7. The method of claim 1, wherein determining a cloud platform of multiple cloud platforms to invoke the web worker on comprises utilizing a cost model to evaluate current sensor data from the first cloud platform and the second cloud platform.

8. The method of claim 1, further comprising:
receiving a command to access the web worker;
determining if the web worker is located on the first cloud platform or the second cloud platform;
sending a command to access the web worker directly to the web worker in a first application program interface (API) communication format if the web worker is located on the first cloud platform; and
sending a command to access the web worker to the second web worker proxy manager in a communication format other than the first API communication format if the web worker is located on the second cloud platform.

9. The method of claim 1, wherein the second web worker proxy manager retrieves code for the web worker directly from a web server.

10. The method of claim 1, further comprising sending code for the web worker to the second web worker proxy manager when the cloud platform determined is the second cloud platform.

11. A method, comprising:
receiving, at a first web worker proxy manager at a first cloud platform, a first command from a web application to access a first web worker; and
determining if the first web worker is located on the first cloud platform or a remote cloud platform;
wherein the first web worker is invoked on one of the first cloud platform and the remote cloud platform upon determining that the first web worker complies with one or more security policies of the web application;
wherein confirmation of invocation of the first web worker is sent to the web application when the first web worker is invoked on one of the first cloud platform and the remote cloud platform;
wherein a table is maintained;
wherein an identification of the first web worker is stored in the table along with information regarding location of the first web worker when the first web worker is invoked on one of the first cloud platform and the remote cloud platform;

wherein the first web worker proxy manager is configured to send the first command to access the first web worker directly to the first web worker upon determining that the first web worker is located on the first cloud platform;
wherein the first web worker proxy manager is further configured to send the first command to access the first web worker to a second web worker proxy manager on the remote cloud platform in a communication format other than the first API communication format upon determining that the first web worker is located on the remote cloud platform; and
wherein the first web worker proxy manager is further configured to receive a second command from the web application or another web worker.

12. The method of claim 11, further comprising:
receiving, at a first web worker proxy manager at the first cloud platform, a command from a second web worker to access a database in a first application program interface (API) communication format; and
determining if the database is located on the first cloud platform or on the second cloud platform;
sending a command to access the database directly to the database in the first API communication format upon determining that the database is located on the first cloud platform; and
sending a command to access the database to the second web worker proxy manager in a communication format other than the first API communication format upon determining that the database is located on the second cloud platform.

13. The method of claim 12, further comprising:
synchronizing the database with another database.

14. A cloud platform comprising:
a memory;
an interface;
a processor in communication with the memory;
the memory storing a web worker proxy manager executable by the processor to:
receive a first command from a web application to be executed by a first web worker stored in memory; and
determine whether the first web worker is located on the cloud platform or on a remote cloud platform;
wherein the first web worker is executed on one of the first cloud platform and the remote cloud platform upon determining that the first web worker complies with one or more security policies of the web application;
wherein confirmation of execution of the first web worker is sent to the web application when the first web worker is executed on one of the first cloud platform and the remote cloud platform;
wherein a table is maintained;
wherein an identification of the first web worker is stored in the table along with information regarding location of the first web worker when the first web worker is executed on one of the first cloud platform and the remote cloud platform;
wherein the first command to be executed by the first web worker is sent directly to the first web worker upon determining that the first web worker is located on the cloud platform;
wherein the first command to be executed by the first web worker is sent to a remote web worker proxy manager stored in memory at the remote cloud platform upon determining that the first web worker is located on the remote cloud platform; and wherein the web worker proxy manager receives a second command from the web application or another web worker stored in memory.

15. An apparatus, comprising:
a processor in communication with memory storing a first web worker proxy manager executable by the processor for:
    receiving a first command from a web application to execute a web worker stored in memory;
    determining a cloud platform of multiple cloud platforms to execute the web worker on, wherein the multiple cloud platforms include the first cloud platform and a second cloud platform remote to the first cloud platform;
    executing the web worker on the cloud platform determined upon determining that the web worker complies with one or more security policies of the web application;
    sending confirmation of execution of the web worker to the web application upon executing the web worker on the cloud platform determined;
    maintaining a table; and
    storing an identification of the web worker in the table along with information regarding location of the web worker upon executing the web worker on the cloud platform determined;
    wherein the first web worker proxy manager communicates with a second web worker proxy manager stored in memory at the second cloud platform to cause execution of the web worker on the second cloud platform when the cloud platform determined is the second cloud platform, and wherein the second web worker proxy manager determines and allocates at least one computing resource of the second cloud platform for the web worker based on communication from the first web worker proxy manager; and
    wherein the first web worker proxy manager receives a second command from the web application or another web worker stored in memory.

16. An apparatus, comprising:
a processor in communication with memory storing a first web worker proxy manager executable by the processor for:
    receiving a first command from a web application to access a first web worker stored in memory; and
    determining if the first web worker is located on the first cloud platform or a remote cloud platform;
    wherein the first web worker is executed on one of the first cloud platform and the remote cloud platform upon determining that the first web worker complies with one or more security policies of the web application;
    wherein confirmation of execution of the first web worker is sent to the web application when the first web worker is executed on one of the first cloud platform and the remote cloud platform;
    wherein a table is maintained;
    wherein an identification of the first web worker is stored in the table along with information regarding location of the first web worker when the first web worker is executed on one of the first cloud platform and the remote cloud platform;
    wherein the first web worker proxy manager sends the first command to access the first web worker directly to the first web worker upon determining that the first web worker is located on the first cloud platform;
    wherein the first web worker proxy manager sends the first command to access the first web worker to a second web worker proxy manager stored in memory on the remote cloud platform upon determining that the first web worker is located on the remote cloud platform; and
    wherein the first web worker proxy manager receives a second command from the web application or another web worker stored in memory.

17. A computer program product comprising a computer-readable hardware storage medium having program code embodied therewith, the program code being executable by a computer to implement a method, the method comprising:
    receiving, at a first web worker proxy manager at a first cloud platform, a first command from a web application to invoke a web worker;
    determining a cloud platform of multiple cloud platforms to invoke the web worker on, wherein the multiple cloud platforms include the first cloud platform and a second cloud platform remote to the first cloud platform;
    invoking the web worker on the cloud platform determined upon determining that the web worker complies with one or more security policies of the web application;
    sending confirmation of invocation of the web worker to the web application upon invoking the web worker on the cloud platform determined;
    maintaining a table; and
    storing an identification of the web worker in the table along with information regarding location of the web worker upon invoking the web worker on the cloud platform determined;
    wherein the first web worker proxy manager is configured to communicate with a second web worker proxy manager at the second cloud platform to cause invocation of the web worker on the second cloud platform when the cloud platform determined is the second cloud platform, and wherein the second web worker proxy manager is configured to determine and allocate at least one computing resource of the second cloud platform for the web worker based on communication from the first web worker proxy manager; and
    wherein the first web worker proxy manager is further configured to receive a second command from the web application or another web worker.

18. A computer program product comprising a computer-readable hardware storage medium having program code embodied therewith, the program code being executable by a computer to implement a method, the method comprising:
    receiving, at a first web worker proxy manager at the first cloud platform, a first command from a web application to access a first web worker; and
    determining if the first web worker is located on the first cloud platform or a remote cloud platform;
    wherein the first web worker is invoked on one of the first cloud platform and the remote cloud platform upon determining that the first web worker complies with one or more security policies of the web application;
    wherein confirmation of invocation of the first web worker is sent to the web application when the first web worker is invoked on one of the first cloud platform and the remote cloud platform;
    wherein a table is maintained;
    wherein an identification of the first web worker is stored in the table along with information regarding location of the first web worker when the first web worker is invoked on one of the first cloud platform and the remote cloud platform;

wherein the first web worker proxy manager is configured to send the first command to access the first web worker directly to the first web worker upon determining that the first web worker is located on the first cloud platform;

wherein the first web worker proxy manager is further configured to send the first command to access the first web worker to a second web worker proxy manager on the remote cloud platform upon determining that the first web worker is located on the remote cloud platform; and wherein the first web worker proxy manager is further configured to receive a second command from the web application or another web worker.

* * * * *